United States Patent [19]

Michelson

[11] Patent Number: 5,628,028
[45] Date of Patent: May 6, 1997

[54] REPROGRAMMABLE PCMCIA CARD AND METHOD AND APPARATUS EMPLOYING SAME

[75] Inventor: Henry S. Michelson, North Andover, Mass.

[73] Assignee: Data Translation, Inc., Mass.

[21] Appl. No.: 397,390

[22] Filed: Mar. 2, 1995

[51] Int. Cl.[6] .......................... G06F 13/10; G06F 15/177
[52] U.S. Cl. .......................... 395/828; 395/282; 395/283; 395/284; 395/822
[58] Field of Search .................................... 395/889, 892, 395/282, 283, 284, 828, 830

[56] References Cited

U.S. PATENT DOCUMENTS

| | | | |
|---|---|---|---|
| 5,014,193 | 5/1991 | Garner et al. | 364/200 |
| 5,023,832 | 6/1991 | Fulcher, Jr. et al. | 364/900 |
| 5,034,813 | 7/1991 | Dolazza et al. | 358/138 |
| 5,257,387 | 10/1993 | Richek et al. | 395/800 |
| 5,263,148 | 11/1993 | Jones, Jr. et al. | 395/500 |
| 5,301,344 | 4/1994 | Kolchinsky | 395/800 |
| 5,302,947 | 4/1994 | Fuller et al. | 340/825 |
| 5,319,751 | 6/1994 | Garney | 395/200 |
| 5,334,046 | 8/1994 | Brouilette et al. | 439/540 |
| 5,357,573 | 10/1994 | Walters | 380/25 |
| 5,428,748 | 6/1995 | Davidson et al. | 395/829 |
| 5,432,941 | 7/1995 | Crick et al. | 395/700 |
| 5,517,646 | 5/1996 | Piccirillo et al. | 395/700 |
| 5,535,331 | 7/1996 | Swoboda et al. | 395/183.21 |
| 5,548,759 | 8/1996 | Lipe | 395/600 |

OTHER PUBLICATIONS

Personal Computer Memory Card International Association, "PCMCIA PC Card Standard," P. i–ixx, 1–1—1–4, 2–1—2–4, 3–1—3–28, 4–1—4–38, Jul. 1993.
Bindra, *Electronic Engineering Times*, "FPGAs moving to boost DSP applications," Issue 837, Feb. 27, 1995.
Fuller, *Electronic Engineering Times*, "AT&T rolls 40,000-gate Orca FPGA," Issue 837, Feb. 27, 1995.
Romanchi, *Test & Measurement World*, "Portables Are Proliferating," pp. 41–44, Feb. 15, 1995.
Beachler et al., *Electronic Engineering Times*, "Reconfiguration Showing Promise," pp. T–41—T–44, Apr. 11, 1994.
Hutchings et al., *Electronic Engineering Times*, "Digital Signal Processing, Reconfiguring Speeds Up Computing," pp. 50–51, Oct. 17, 1994.

*Primary Examiner*—Jack B. Harvey
*Assistant Examiner*—Jigar Pancholi
*Attorney, Agent, or Firm*—Fish & Richardson P.C.

[57] ABSTRACT

A PCMCIA card having an FPGA based card controller that is programmed with FPGA programming data stored on a host computer through a standard PCMCIA bus.

26 Claims, 4 Drawing Sheets

REPROGRAMMABLE PCMCIA CARD AND METHOD AND APPARATUS EMPLOYING SAME

BACKGROUND

This invention relates to programming and reprogramming the hardware configuration of a (PCMCIA) card.

Personal computer memory card international association (PCMCIA) cards are computer cards that meet the minimum compliance requirements of the PCMCIA standard (e.g., release 2.1, which is hereby incorporated by reference). PCMCIA cards are typically used to add functionality or memory to a personal, portable, or desktop computer (i.e., host computer), as described in PCMCIA Standard release 2.1. The most popular PCMCIA cards are fax/modems and memory cards used in laptop computers. For example, a memory card having a hard disk drive can provide 200 MB of additional memory. Many other PCMCIA cards are available, including input/output (I/O) PCMCIA cards that transfer data between a host computer system and an I/O bus and data acquisition cards. Typically, data acquisition cards receive and digitize analog information from sensors and temporarily store the information before transferring it to the host computer. Additionally, data acquisition cards are used by the host computer to send control and data signals to external analog and digital controllers.

A typical PCMCIA card includes a standard PCMCIA connector connected to a PCMCIA interface circuit through a standard PCMCIA bus. The PCMCIA interface circuit operates according to the standard PCMCIA protocol to send data to and receive data from a host computer. The typical PCMCIA card also includes a PCMCIA card controller that sends data to and receives data from the PCMCIA interface circuit and controls the operation of the functional hardware on the card. For example, if the PCMCIA card is a memory card, then the functional hardware is memory (e.g., a bank of random access memory (RAM) chips (static or dynamic) or a hard disk drive) and the PCMCIA card controller controls reading and writing to the memory.

PCMCIA card controllers and interface circuits can be implemented as hardwired logic (e.g., one or more custom gate arrays) or as programmable logic (e.g., one or more field programmable gate arrays (FPGAS). FPGAs are typically programmed for operation whenever power is cycled off and then on. For example, if a PCMCIA card is inserted within a powered-up host computer or inserted into a powered-down host computer that is then powered-up, the PCMCIA card FPGA is programmed.

The programmable architecture of FPGAs is provided through programmable logic blocks interconnected by a hierarchy of routing resources. The devices are customized by loading programming data into internal static memory cells. FPGA programming data are design-specific data that define the functional operation of the FPGA's internal blocks and their interconnections (e.g., the functional operation of the PCMCIA card controller and interface circuit).

Typically, when a PCMCIA card, having the PCMCIA card controller and interface circuit implemented in an FPGA(s), is inserted in an operating (i.e., powered) host computer or is inserted in a powered down host computer that is then powered-up, the FPGA is programmed with FPGA programming data stored in non-volatile memory (e.g., EPROM, EEPROM, Flash memory, etc.) on the PCMCIA card. The EPROM(s) required to store the FPGA programming data generally consumes a large amount of the PCMCIA card real estate.

SUMMARY

In general, the invention includes a PCMCIA card having an FPGA based card controller that is programmed with FPGA programming data stored on a host computer through a standard PCMCIA bus. Storing FPGA programming data on the host computer allows a user access to a practically unlimited number of FPGA programming data files to program and reprogram the FPGA of the PCMCIA FPGA based card controller for different applications and permits a user to supplement, update, improve, or otherwise modify operation for existing applications. Additionally, storing the FPGA programming data files on the host computer saves valuable PCMCIA card real estate, reduces the amount of power required by the card during FPGA programming, and reduces the cost of the PCMCIA hardware.

In preferred embodiments, the host computer includes a PCMCIA adapter circuit coupled to a PCMCIA host socket which is mechanically and electrically connected to a PCMCIA card connector on the PCMCIA card. A PCMCIA interface circuit is connected to the PCMCIA card connector on the PCMCIA card. Using Card and Socket Services software stored in host memory, the host processor reads Card Information Structure (CIS) data from a memory device, such as an EEPROM, on the PCMCIA card and configures the host computer and PCMCIA card to operate together. Additionally, using application software stored in host memory, the processor selects an FPGA programming data file from host memory and sends data from the selected FPGA programming data file through the PCMCIA adapter circuit to the PCMCIA interface circuit. The PCMCIA interface circuit loads the data into a PCMCIA card controller FPGA to program the FPGA. When an error or a different user application is detected or when a user creates a new FPGA programming data file or modifies an existing FPGA programming data file, the processor is instructed to select another FPGA programming data file from host memory. The processor then sends data from the newly selected FPGA programming data file to the PCMCIA interface circuit, and the PCMCIA interface circuit loads the data into the PCMCIA card controller FPGA to reprogram the FPGA. The PCMCIA card may also have a functionality circuit that includes additional functional hardware specific to the function of the PCMCIA card.

Additional advantages and features are apparent from the following.

DETAILED DESCRIPTION

Figure 1:
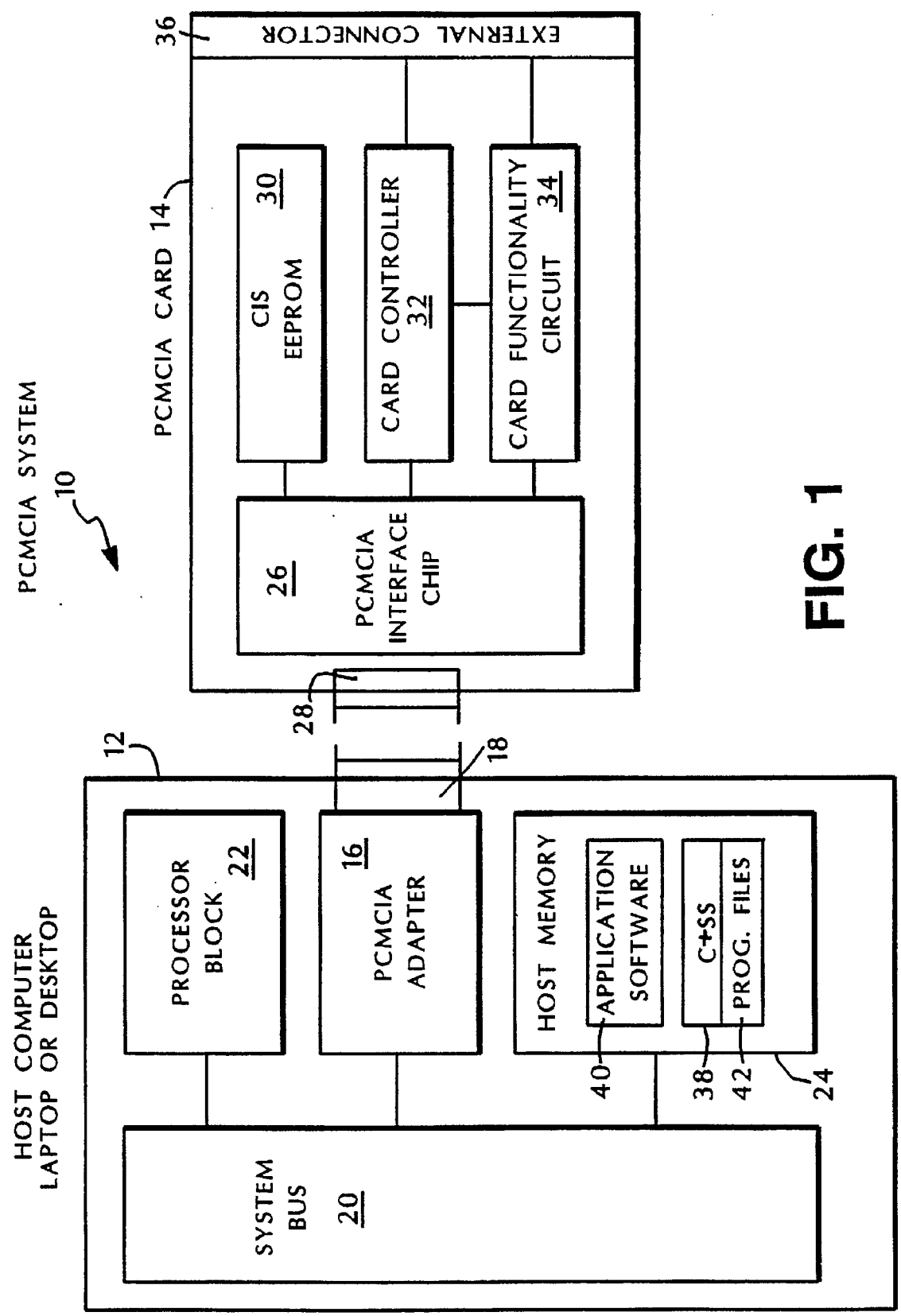
FIG. 1 is a block diagram of a PCMCIA system including a host computer and a PCMCIA card, according to the invention.

Referring to FIG. 1, a PCMCIA system 10 includes a host computer 12 and a PCMCIA card 14. Within host computer 12, a PCMCIA adapter 16, connected to a standard 68 pin PCMCIA host socket 18 (e.g., part number 146025-1, manufactured by AMP, Inc.), is coupled to a system bus 20 that interconnects PCMCIA adapter 16, a host processor 22, and a host memory 24. Within PCMCIA card 14, a PCMCIA interface chip 26 (e.g., part number Z86017, manufactured by Zilog), connected to a standard 68 pin PCMCIA card connector 28 (e.g., part number 535632-1, manufactured by AMP, Inc.), is coupled to a Card Information Structure (CIS) EEPROM 30 (e.g., part number XL90C21-SO8, manufactured by Atmel), a PCMCIA card controller 32, and a card functionality circuit 34. Both card controller 32 and card functionality circuit 34 are coupled to external connector 36 (e.g., part number 558134-1, manufactured by AMP, Inc.). No external connector is needed if the PCMCIA card is a memory card, and no card functionality circuit may be necessary where the PCMCIA card is an I/O card (i.e., all functionality is located within the card controller 32).

Address, data, and control signals are transferred between host computer 12 and PCMCIA card 14 through PCMCIA adapter 16 and PCMCIA interface chip 26 which are designed to transfer data in accordance with PCMCIA release 2.1 protocol. PCMCIA cards are 3.37 inches (85.6 mm) in length and 2.126 inches (54 mm) in width. However, there are three different maximum thicknesses specified for PCMCIA cards: a type one card is 0.13 inches (3.3 mm) in thickness; a type two card is 0.196 inches (5 mm) in thickness; and a type three card is 0.413 inches (10.5 mm) in thickness. The standard PCMCIA host socket is about 2.126 inches (54 mm) in width and has 68 pins arranged in two rows, and the standard PCMCIA card connector is also about 2.126 inches (54 mm) in width and has 68 pin sockets that correspond to the pins of the host socket. The left side of the card connector is mechanically keyed differently from the right side, and the host socket is keyed to accept this configuration to prevent the PCMCIA card from being inserted upside down.

Figure 2:
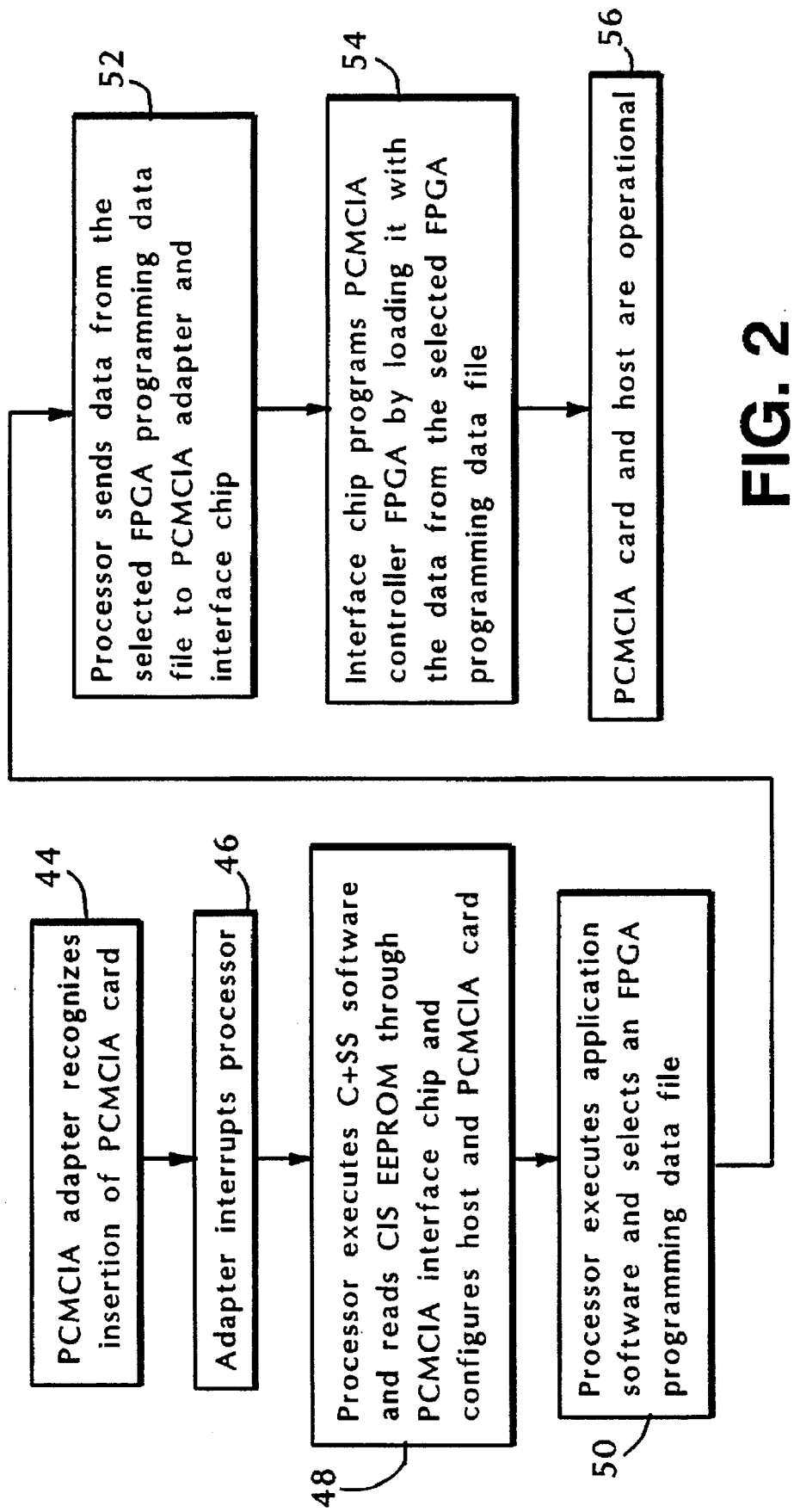
FIG. 2 is a flow chart depicting the steps required to configure a host computer and a PCMCIA card and the steps required to program a programmable PCMCIA FPGA based card controller with FPGA programming data resident in host memory.

Referring also to FIG. 2, when PCMCIA card 14 card connector 28 is inserted in PCMCIA host socket 18 of host computer 12, PCMCIA adapter 16 recognizes (step 44) the insertion and interrupts (step 46) processor 22. Alternatively, if PCMCIA card 14 is inserted while host computer 12 is turned off (i.e., powered-down), host computer 12 learns of the existence of PCMCIA card 14 during the power-on procedure. Processor 22 then executes (step 48) Card and Socket Services 38 (C&SS) software resident in host memory 24 and through PCMCIA interface chip 26 reads CIS data from CIS EEPROM 30. As a minimum, the CIS data must sufficiently identify the PCMCIA card to the host, to enable the processor 22 to configure the host computer 12 and the PCMCIA card 14 to operate together and to enable the processor to select the appropriate application software 40 from host memory 24. The CIS data specifically identify the card manufacturer (e.g., Data Translation, Inc.) and card identification (ID) number and includes a variety of set-up information, including base address, interrupt level, size of address window, and other information regarding the card's functionality, as specified by release 2.1. The CIS data are entered into the EEPROM at the time of card manufacture and are not thereafter changed. Hence, configuration of host computer 12 and PCMCIA card 14 is completed without the use of card controller 32.

Processor 22 then executes (step 50) the application software 40 resident in host memory 24 that corresponds to PCMCIA card 14. The application software 40 causes the processor to either select a default FPGA programming data file 42 from host memory 24 that corresponds to a particular application for PCMCIA card 14 or request input from the user as to which FPGA programming data file 42 is to be selected from host memory 24. Processor 22 then sends (step 52) the data from the selected FPGA programming data file 42 through PCMCIA adapter 16 to PCMCIA interface chip 26. Interface chip 26 then programs (step 54) a field programmable gate array (FPGA, not shown in FIG. 1) within card controller 32 by loading the data from the FPGA programming data file 42 into the FPGA. Where the application software causes the processor to select a default data programming file, PCMCIA card 14 and host computer 12 are made operable (step 56) without user intervention.

Figure 3:
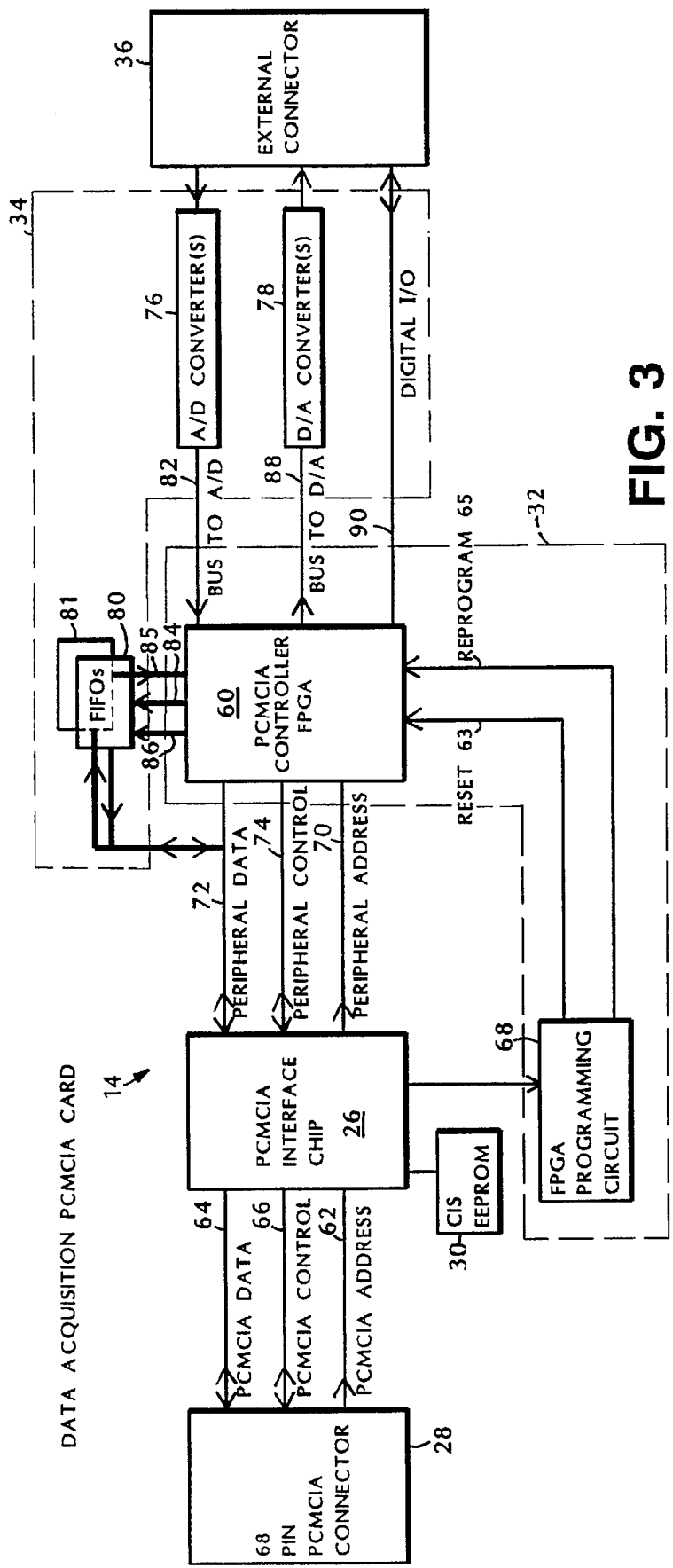
FIG. 3 is a block diagram of a data acquisition PCMCIA card, according to the invention.

Referring to FIG. 3, card controller 32 includes a PCMCIA card controller FPGA 60 (e.g., part number XC3042TQ100-100, manufactured by Xilinx, as described in Xilinx Programmable Logic Data Book, which is hereby incorporated by reference). Through a standard PCMCIA bus (i.e., PCMCIA address lines 62, data lines 64, and control lines 66) connected to PCMCIA connector 28, interface chip 26 receives FPGA programming data from host computer 12 (FIG. 1). Interface chip 26 initiates FPGA 60 programming through FPGA programming circuit 68, which drives reset line 63 and reprogram line 65, and completes FPGA 60 programming by loading the FPGA programming data into FPGA 60 through peripheral data lines 72.

Figure 4A:
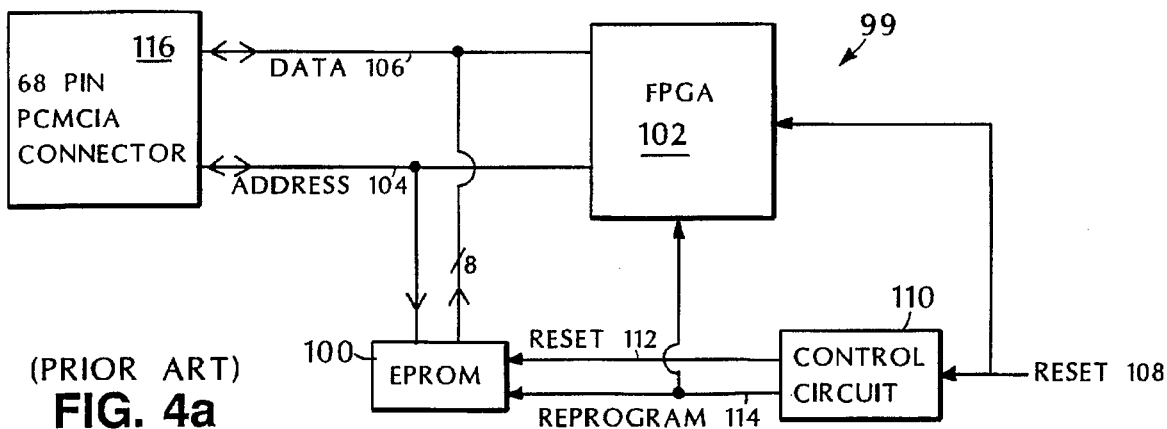
FIGS. 4a and 4b are block diagrams of prior art FPGA programming circuits.

The PCMCIA card interface circuit and PCMCIA card controller of typical prior art PCMCIA cards are usually combined in the same (i.e., common) FPGA. As a result, in order to send CIS data to the host, the FPGA has to first be programmed with data stored in nonvolatile memory (e.g., one or more EEPROMs, EPROMs, or Flash memory) on the PCMCIA card. The nonvolatile memory requires valuable PCMCIA card real estate, and the power required by the memory during FPGA programming reduces the available battery power in portable computers, Referring to FIG. 4a, in a typical prior art PCMCIA card 99, an EPROM(s) 100 is used to store FPGA programming data and is connected to a PCMCIA interface and card controller FPGA 102 through address lines 104 and data lines 106 (e.g., byte wide parallel inputs). On power-up, a reset circuit (not shown) asserts a reset line 108 to FPGA 102 and to a control circuit 110. Control circuit 110 asserts a reset line 112 to EPROM 100 and asserts a reprogram line 114 to EPROM 100 and FPGA 102 to initiate programming of FPGA 102 with FPGA programming data stored in EPROM 100. As a result, PCMCIA card 99 is programmed without intervention from the host computer (not shown) to which PCMCIA card 99 is connected through PCMCIA card connector 116.

Figure 4B:
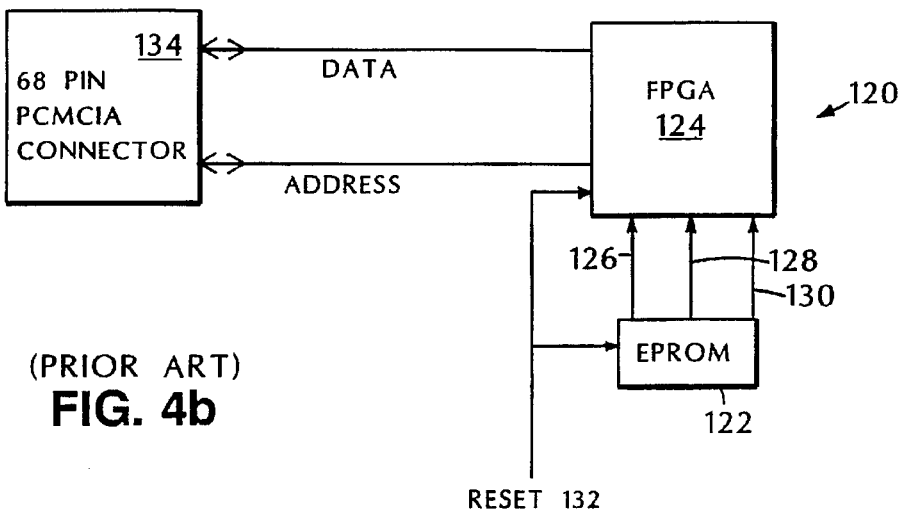

Referring to FIG. 4b, in another typical prior art PCMCIA card 120, an EPROM 122 is used to store FPGA programming data and is connected to a PCMCIA interface and card controller FPGA 124 through a serial data-in line 126, a strobe line 128, and a reprogram line 130. On power-up, a reset circuit (not shown) asserts a reset line 132 to FPGA 124 and to EPROM 122 to initiate programming of FPGA 124 with FPGA programming data stored in EPROM 122. As a result, again PCMCIA card 120 is programmed without intervention from the host computer (not shown) to which PCMCIA card 120 is connected through PCMCIA card connector 134.

Referring again to FIG. 3, as an example, PCMCIA card 14 is a data acquisition card, and card functionality circuit 34 includes an analog to digital (A/D) converter 76 (e.g., part number LTC1290, manufactured by Linear Technology) and a digital to analog (D/A) converter 78 (e.g., part number MAX532, manufactured by Maxim) connected through external connector 36 to sensors (not shown) and an external analog controller (not shown). FPGA 60 is also connected to an external digital controller (not shown) through external connector 36. The C&SS software 38, application software 40, and FPGA programming data files 42 in host memory 24 cause the processor 22 to program FPGA 60 to operate as a data acquisition PCMCIA card controller, to, e.g., transfer data and control signals between host computer 12 and the external controllers.

A/D converter 76 receives analog signals from the sensors and converts them to digital signals before sending them over the A/D bus 82 to PCMCIA card controller FPGA 60. Card controller FPGA 60 stores data received from A/D converter 76 in a 512×9 FIFO 80 (e.g., part number MS7201AL-50, manufactured by Mosel-Vitalic) using FIFO data-in signals 84 and FIFO control signals 86 before transferring the data to the host computer 12 through peripheral data lines 72 and PCMCIA interface chip 26.

Data sent from host computer 12 for transmission to the external analog and digital controllers is first stored in a 512×9 FIFO 81 (e.g., part number MS7201AL-50, manufactured by Mosel-Vitalic) through PCMCIA interface chip 26 and peripheral data lines 72. Card controller FPGA 60 then retrieves the stored data from FIFO 81 through FIFO data-out signals 85 and sends the stored digital data over the D/A bus 88 to D/A converter 78 or over digital input/output (I/O) bus 90 directly through external connector 36 to the external digital controller. D/A converter 78 converts digital signals received from FPGA 60 into analog signals before sending them through external connector 36 to the external analog controller.

As an example, external connector 36 has fifteen pin connections: eight pins connected to A/D converter 76 and eight sensors (not shown); two pins connected to D/A converter 78 and to the external analog controller; four digital I/O pins connected to FPGA 60 and to the external digital controller; and one ground pin connected to ground.

For a variety of reasons, including the detection of a PCMCIA card controller 60 malfunction (e.g., error condition detected) or the detection of a user request to change the PCMCIA card application (e.g., software interrupt), PCMCIA card controller 60 may be reprogramed. The host computer executes application software 40 (FIG. 1) in host memory 24 to select a new FPGA programming data file 42 from host memory 24 and then sends the data from the newly selected FPGA programming data file 42 through PCMCIA adapter 16 to PCMCIA interface chip 26. Interface chip 26 uses FPGA programming circuit 68 to reset PCMCIA card controller FPGA 60 and enable reprogramming, and interface chip 26 completes reprogramming by loading the data from the newly selected FPGA programming data file into card controller FPGA 60.

For example, instead of simply storing all the data received from the sensors in the FIFO before sending it to the host computer, card controller FPGA 60 can be reprogrammed with additional functionality that formats the data received from the sensors according to the host computer's requirements before storing the data in the FIFO. Similarly, card controller FPGA 60 can be reprogrammed with additional functionality that analyzes the sensor data and interrupts the host computer when predetermined thresholds are exceeded. In such a system, the host computer need not interact with the PCMCIA card unless a predetermined threshold is exceeded.

For example, a data acquisition PCMCIA card may be coupled to a temperature controller and sensors for determining the temperature of a room. Such a PCMCIA card continually receives data from the sensors and, in a simple data acquisition card, the host computer periodically reads the data acquisition FIFO and analyzes the data to determine if predetermined temperature thresholds have been exceeded. The PCMCIA card could be reprogrammed to analyze the data received from the sensors and interrupt the host computer when a predetermined temperature threshold is exceeded. Hence, the host computer would only read the PCMCIA card FIFO when notified that a threshold had been exceeded.

Moreover, the operation of the PCMCIA card controller may need to change for different user applications. For example, if a temperature controller is moved to a smaller room where temperature fluctuates more quickly, the PCMCIA card controller needs to be reprogrammed to accept data from the temperature sensors more frequently. In such a situation, the user notifies the processor of a change in application and the processor selects a corresponding FPGA programming data file and sends the data to the PCMCIA interface which reprograms the PCMCIA card controller FPGA by loading the FPGA with the new FPGA programming data.

Typically host memory is very large and is supplemented with extended memory (not shown). Hence, a practically unlimited number of FPGA programming data files can be stored within the host computer and made available to the user. The programming and reprogramming of the PCMCIA card controller FPGA is limited only by the size (i.e., capability) of the FPGA. The functionality of the PCMCIA card is limited only by the fixed hardware (i.e., the functional hardware) on the PCMCIA card (e.g., A/D or D/A converters, contacts on and configuration of the external connector, and FIFO size).

For example, a PCMCIA card controller FPGA can be programmed to function as an I/O card controller, a data acquisition card controller, a fax/modem card controller, or a memory card controller; however, the PCMCIA card can only function as these card types if the additional functional hardware is available on the card. For an I/O card controller, the FPGA can be programmed (and reprogrammed) with the functionality required to transfer data between the host computer and the I/O bus (e.g., Small Computer System Interface (SCSI)), and, thus, the only additional functional hardware required is an external I/O bus connector and electrical conductors from the I/O bus connector to the FPGA. For a memory card, additional functional hardware typically includes a bank of static or dynamic RAM chips, ROM chips, flash memory, or a hard disk drive, and the addressing and refreshing functionality can be located within the PCMCIA card controller FPGA and, hence, reprogrammable. As an example, where a portion of a disk drive or a portion of a bank of RAMs becomes damaged and non-functional, the addressing functionality in the FPGA can be reprogrammed to address only the working portion of the memory hardware. For a fax/modem, additional functional hardware generally includes a phone connection, A/D and D/A converters, buffers, and amplifiers, and functionality controlling hardware, for instance, hardware controlling the baud rate, can be located within the FPGA and, thus, reprogrammable.

The FPGA programming data files can be supplied with the PCMCIA card or new, additional, or updated FPGA programming data files can be obtained at a later time. Similarly, users can create their own FPGA programming data files or make modifications as desired.

The PCMCIA interface was described above as a particular integrated circuit chip; however, other hardware can be used to implement the functionality of the interface chip. Similarly, the PCMCIA card was described as a data acquisition card, however, the programmable PCMCIA card controller FPGA can be used on all PCMCIA card types (e.g., fax modem, memory, etc.) with the FPGA programming data files stored on a host computer.

Other embodiments are within the following claims.

What is claimed is:

1. A method of configuring the specific operating functionality for a PCMCIA card connected to a host computer via a standard PCMCIA card connector on said PCMCIA card and a standard PCMCIA host socket on said host computer comprising:

storing at least one FPGA programming data file for configuring a PCMCIA card controller FPGA in a host memory of said host computer, sending data from said FPGA programming data file to the PCMCIA interface circuit on the PCMCIA card through a standard PCMCIA bus, and programming the PCMCIA card controller FPGA to have said specific functionality by loading the FPGA with the data from said stored FPGA programming data file, whereby said PCMCIA card is not limited to a dedicated specific operating functionality provided on said card and can be programmed and reprogrammed with any one of a variety of FPGA programming data files provided by said host.

2. The method of claim 1, further comprising:

reading CIS data from a CIS storage device on the PCMCIA card through a PCMCIA interface circuit on the PCMCIA card and a PCMCIA adapter on the host computer, said sending of data being triggered by an application on said host responding to said CIS data.

3. The method of claim 1, wherein more than one FPGA programming data file is stored in said host memory, and further comprising:

selecting another stored FPGA programming data file;

sending data from said another stored FPGA programming data file through the standard PCMCIA bus to the PCMCIA interface circuit on the PCMCIA card; and reprogramming the PCMCIA card controller FPGA by loading the FPGA with the data from said another stored FPGA programming data file.

4. The method of claim 3, further comprising before selecting:

detecting a new user application, said selecting being in response to said detecting.

5. The method of claim 3, further comprising before selecting:

detecting an error condition.

6. The method of claim 1, further comprising:

storing new FPGA programming data files in the host memory.

7. The method of claim 6, further comprising:

selecting a newly stored FPGA programming data file;

sending data from said newly stored FPGA programming data file through the standard PCMCIA bus to the PCMCIA interface circuit on the PCMCIA card; and reprogramming the PCMCIA card controller FPGA by loading the FPGA with the data from said newly stored FPGA programming data file.

8. A PCMCIA card comprising a printed circuit board;

a standard PCMCIA card connector mounted on said printed circuit board;

a PCMCIA interface circuit electrically connected to the PCMCIA card connector for transferring data through the PCMCIA connector according to standard PCMCIA protocol, for transferring CIS data to a host computer system, for transferring FPGA programming data received from the host computer system, said transferring of FPGA programming data being triggered in response to receipt of said CIS data at said host computer system, and for programming a PCMCIA card controller FPGA with said FPGA programming data received from said host computer system;

a CIS storage device, electrically connected to the PCMCIA interface circuit, for storing CIS data; and a PCMCIA card controller, including the PCMCIA card controller FPGA, electrically connected to the PCMCIA interface circuit, for controlling the operation of the card to have specific operating functionality specified by said FPGA programing data received from said host computer system, whereby said PCMCIA card is not limited to a dedicated specific operating functionality provided on said card and can be programmed and reprogramed with anyone of a variety of FPGA programming data files provided by said host.

9. The PCMCIA card of claim 8, further comprising:

an FPGA programming circuit electrically connected to the PCMCIA interface circuit and the PCMCIA card controller.

10. The PCMCIA card of claim 8, wherein the CIS storage device is an EEPROM.

11. The PCMCIA card of claim 8, further comprising:

a card functionality circuit.

12. The PCMCIA card of claim 11, wherein the PCMCIA card is a memory card and the functionality circuit includes:

a bank of random access memory devices for storing data.

13. The PCMCIA card of claim 11, wherein the PCMCIA card is a memory card and the functionality circuit includes:

a disk drive for storing data.

14. The PCMCIA card of claim 11, wherein the PCMCIA card is an I/O card and the functionality circuit includes:

an external I/O bus connector; and conductors electrically connecting the I/O bus connector to the PCMCIA card controller FPGA.

15. The PCMCIA card of claim 11, wherein the PCMCIA card is a fax/modem card and the functionality circuit includes:

an external telephone connector;

an A/D converter coupled to the external telephone connector and to the PCMCIA card controller FPGA;

a D/A converter coupled to the external telephone connector and to the PCMCIA card controller FPGA; and a buffer connected to the PCMCIA card controller FPGA.

16. The PCMCIA card of claim 11, wherein the PCMCIA card is a data acquisition card and the functionality circuit includes:

an external connector for connecting to one or more external sensors; and an A/D converter connected to the PCMCIA card controller and connected to the external connector for receiving analog signals from the external sensors, wherein the A/D converter converts the received analog signals into digital signals before sending them to the PCMCIA card controller.

17. The PCMCIA card of claim 16, where in the functionality circuit further includes:

a digital controller, wherein the PCMCIA card controller is connected to the external connector for sending digital signals to the external digital controller;

an analog controller connected to the external connector; and a D/A converter connected to the external connector and the PCMCIA card controller, wherein the D/A converter converts digital signals from the PCMCIA card controller into analog signals before sending them through the external connector to the external analog controller.

18. The PCMCIA card of claim 17, further including:

a FIFO connected to the PCMCIA card controller, wherein the PCMCIA card controller stores data, represented by the received digital signals from the A/D converter, in the FIFO before transferring the data to the host computer.

19. The PCMCIA card of claim 17, further including:

a FIFO connected to the PCMCIA card controller, wherein the PCMCIA card controller stores data, represented by the received digital signals from the host computer, in the FIFO before transferring the data to the external analog and digital controllers.

20. The PCMCIA card of claim 17, further including:

a buffer connected to the PCMCIA card controller, wherein the PCMCIA card controller stores data, represented by the received digital signals from the A/D converter, in the buffer before transferring the data to the host computer.

21. A PCMCIA system comprising a host computer including:

a standard PCMCIA host socket;

a PCMCIA adapter circuit electrically connected to the PCMCIA host socket for transferring data through the PCMCIA host socket according to standard PCMCIA protocol;

a processor coupled to the PCMCIA adapter circuit; and a host memory coupled to the processor and the PCMCIA adapter circuit, wherein the host memory stores one or more FPGA programming data files defining the specific operating functionality for a PCMCIA card; and a PCMCIA card including:

a PCMCIA printed circuit board;

a standard PCMCIA card connector mounted on said PCMCIA printed circuit board and mechanically and electrically coupled to the PCMCIA host socket; a PCMCIA interface circuit electrically connected to the PCMCIA card connector for transferring data through the PCMCIA card connector with said PCMCIA adapter circuit according to standard PCMCIA protocol, for transferring CIS data to a host computer system, for transferring FPGA programming data from the host computer system in response to said CIS data, and for programming a PCMCIA card controller FPGA with said FPGA programming data received from said host computer;

a CIS storage device, electrically connected to the PCMCIA interface circuit, for storing said CIS data; and a PCMCIA card controller, including the PCMCIA card controller FPGA, electrically connected to the PCMCIA interface circuit, for controlling the operation of the card to have specific operating functionality specified by said FPGA programming data received from said host computer system, whereby said PCMCIA card is not limited to a dedicated specific operating functionality provided on said card and can be programmed and reprogrammed with any one of a variety of FPGA programming data files provided by said host.

22. The PCMCIA system of claim 21, wherein said PCMCIA card further comprises:

an FPGA programming circuit electrically connected to the PCMCIA interface circuit and the PCMCIA card controller FPGA.

23. The PCMCIA system of claim 21, further comprising:

a card functionality circuit.

24. The PCMCIA system of claim 21, wherein the PCMCIA adapter detects the insertion of the PCMCIA card into the host system and interrupts the processor which causes the processor to read CIS data from the CIS storage device through the PCMCIA interface circuit.

25. The PCMCIA system of claim 24, wherein the host memory further stores Card and Socket Services software which is executed by the processor when the processor is interrupted by the PCMCIA adapter and which causes the host processor to read the CIS data and configure the host computer and PCMCIA card to operate together.

26. The PCMCIA system of claim 25, wherein the host memory further stores application software which is executed by the host processor after the processor reads the CIS data and which causes the processor to select the one of the FPGA programming data files from host memory.

* * * * *